(12) United States Patent
Song et al.

(10) Patent No.: US 10,187,281 B2
(45) Date of Patent: Jan. 22, 2019

(54) METHOD AND SYSTEM OF MONITORING A SERVICE OBJECT

(71) Applicant: Alibaba Group Holding Limited, George Town, Grand Cayman (KY)

(72) Inventors: Zhuo Song, Hangzhou (CN); Yu Li, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 223 days.

(21) Appl. No.: 15/097,185

(22) Filed: Apr. 12, 2016

(65) Prior Publication Data

US 2016/0323169 A1 Nov. 3, 2016

(30) Foreign Application Priority Data

Apr. 30, 2015 (CN) .......................... 2015 1 0219201

(51) Int. Cl.
*H04L 12/26* (2006.01)
*H04L 29/08* (2006.01)
*H04L 12/24* (2006.01)

(52) U.S. Cl.
CPC .......... *H04L 43/0876* (2013.01); *H04L 41/50* (2013.01); *H04L 67/26* (2013.01); *H04L 41/142* (2013.01); *H04L 43/067* (2013.01); *H04L 43/0817* (2013.01)

(58) Field of Classification Search
CPC ..... H04L 43/02; H04L 43/022; H04L 43/026; H04L 43/04; H04L 43/045; H04L 43/06; H04L 43/062; H04L 43/067; H04L 43/08; H04L 43/0817; H04L 43/0876; H04L 43/10; H04L 43/103; H04L 43/106; H04L 43/12
See application file for complete search history.

(56) References Cited

U.S. PATENT DOCUMENTS

| 6,044,439 | A | 3/2000 | Ballard |
| 6,976,258 | B1 | 12/2005 | Goyal |
| 7,062,642 | B1 * | 6/2006 | Langrind ............ H04L 43/0811 398/50 |
| 7,457,870 | B1 | 11/2008 | Lownsbrough |

(Continued)

OTHER PUBLICATIONS

Ngo et al., "WANMon: A Resource Usage Monitoring Tool for Ad Hoc Wireless Networks", Proceeding of the 28th Annual IEEE International Conference on Local Computer Networks, 2003, pp. 738-745.*

*Primary Examiner* — Vivek Srivastava
*Assistant Examiner* — William C McBeth
(74) *Attorney, Agent, or Firm* — Shun Yao; Park, Vaughan, Fleming & Dowler LLP

(57) ABSTRACT

Embodiments of the present application provide a method and system for monitoring a service object. During operation, the system obtains resource consumption data corresponding to one or more service objects. The resource consumption data may include data indicating device resource usage. The system may then accumulate the resource consumption data in a predetermined storage object within a statistical time period corresponding to a service object. The system may sort the resource consumption data accumulated in the predetermined storage object within an update time period corresponding to the service object. The system may then load the sorted resource consumption data.

20 Claims, 11 Drawing Sheets

(56) References Cited

U.S. PATENT DOCUMENTS

| | | | |
|---|---|---|---|
| 7,617,314 B1* | 11/2009 | Bansod | H04L 43/12 709/224 |
| 7,639,613 B1* | 12/2009 | Ghannadian | H04L 43/026 370/232 |
| 7,653,722 B1* | 1/2010 | Krishna | H04L 43/06 709/224 |
| 9,612,758 B1 | 4/2017 | Liu | |
| 2002/0161990 A1 | 10/2002 | Zhang | |
| 2003/0135612 A1* | 7/2003 | Huntington | H04L 41/0803 709/224 |
| 2005/0052992 A1 | 3/2005 | Cloonan | |
| 2005/0257222 A1 | 11/2005 | Davis | |
| 2005/0268075 A1 | 12/2005 | Caprioli | |
| 2006/0028999 A1* | 2/2006 | Iakobashvili | H04L 41/142 370/252 |
| 2006/0143617 A1 | 6/2006 | Knauerhase | |
| 2006/0288015 A1 | 12/2006 | Schirripa | |
| 2007/0041331 A1* | 2/2007 | Ma | H04L 43/024 370/252 |
| 2007/0276990 A1 | 11/2007 | Mosek | |
| 2007/0283009 A1 | 12/2007 | Takemura | |
| 2008/0216086 A1 | 9/2008 | Tanaka | |
| 2008/0288661 A1 | 11/2008 | Galles | |
| 2009/0144731 A1 | 6/2009 | Brown | |
| 2009/0300210 A1 | 12/2009 | Ferris | |
| 2009/0307396 A1 | 12/2009 | Nogueras | |
| 2011/0106802 A1 | 5/2011 | Pinkney | |
| 2011/0173251 A1 | 7/2011 | Sandhu | |
| 2011/0265164 A1 | 10/2011 | Lucovsky | |
| 2011/0276951 A1* | 11/2011 | Jain | G06F 11/3006 717/140 |
| 2011/0296488 A1 | 12/2011 | Dandekar | |
| 2012/0084262 A1 | 4/2012 | Dwarampudi | |
| 2012/0221611 A1 | 8/2012 | Watanabe | |
| 2012/0239896 A1 | 9/2012 | Sobel | |
| 2012/0324572 A1 | 12/2012 | Gordon | |
| 2013/0055241 A1 | 2/2013 | De | |
| 2013/0246619 A1 | 9/2013 | Raja | |
| 2014/0019689 A1 | 1/2014 | Cain, III | |
| 2014/0066101 A1 | 3/2014 | Lyman | |
| 2014/0177497 A1 | 6/2014 | Backholm | |
| 2014/0223427 A1 | 8/2014 | Bootland | |
| 2015/0120914 A1* | 4/2015 | Wada | H04L 43/0882 709/224 |
| 2015/0150003 A1 | 5/2015 | Emelyanov | |
| 2015/0169341 A1 | 6/2015 | Gulati | |
| 2015/0181617 A1 | 6/2015 | Luna | |
| 2015/0212919 A1 | 7/2015 | Srour | |
| 2015/0215816 A1 | 7/2015 | Abou-Elkheir | |
| 2015/0347262 A1* | 12/2015 | Vyas | G06F 11/3409 718/104 |
| 2016/0021211 A1 | 1/2016 | Yellin | |
| 2016/0080229 A1* | 3/2016 | Kobayashi | H04L 43/04 709/224 |
| 2016/0162320 A1 | 6/2016 | Singh | |

* cited by examiner

METHOD AND SYSTEM OF MONITORING A SERVICE OBJECT

RELATED APPLICATION

Under 35 U.S.C. 119, this application claims the benefits and rights of priority of Chinese Patent Application No. 201510219201.5, filed 30 Apr. 2015.

BACKGROUND

Field

The present invention relates to computer processing, and particularly relates to a method and system of monitoring a service object.

Related Art

With the rapid development of Internet technology, the development of various application services and Web services such as instant messaging and search is advancing quickly. To monitor various application services and network services, generally one needs to sort all processes (e.g., using top command) in the kernel of an operating system according to factors such as resource usage. For example, this may involve collecting statistics of connections (e.g., netstat command) in the system and memory usage (e.g., slabtop command).

In a high performance computer, it is becoming more common to collect statistics for a million or more objects. For example, with high-traffic services such as instant messaging and search, and cloud computing-based services (e.g., Infrastructure as a Service (IaaS)), it is very common that a single computer reaches a million or even more connections. The system typically needs to obtain statistics in real-time for millions of objects. For example, out of millions of connections, the system may collect statistics for the 100 connections with greatest traffic.

At present there are many approaches to collecting statistics, and collecting statistics involving a unit of time is generally based on a timer. Using the collection of traffic statistics as an example, to trace the traffic conditions within one second for each connection, the system may need to start a timer when establishing each connection, and set a timeout duration to 1 second. This way, each time the timer times out, the system calculates the traffic within the previous second, and performs sorting.

Such timer-based approaches to collecting statistics is acceptable in cases where the number of objects is relatively small. However, since timer-based approaches need to interrupt context and perform traverse, in cases of a million or more objects, the system needs to perform as many timeout operations. Since the timing is generally very short, this type of timing operation may be very frequent. It is likely that multiple connection timers may timeout simultaneously. In this case, the computer's performance may consume enormous amounts of resources, even to the point that the computer is no longer capable of operating and may crash.

In addition, current statistical approaches may collect statistics at different parts of the kernel. When the system load increases, a statistics module's resource consumption may also increase, and use too many resources in an uncontrolled manner. This may reduce the normal resource consumption of a service module, thereby degrading the performance of the service module.

Further, current statistical approaches are typically carried out independently according to specific scenarios (e.g., traffic, storage, memory), and cannot be applied to other service scenarios. In addition, with current statistical approaches, during hot upgrade of the service modules, previous statistical information may be lost. Re-initialization of the logic for collecting statistics is also time consuming.

SUMMARY

One embodiment of the present invention provides a system for monitoring a service object. During operation, the system may obtain resource consumption data corresponding to one or more service objects. The resource consumption data may include data indicating device resource usage. The system may accumulate the resource consumption data in a predetermined storage object within a statistical time period corresponding to the service object. The system may then sort the resource consumption data accumulated in the predetermined storage object within an update time period corresponding to the service object. The system may subsequently load the sorted resource consumption data.

In a variation of this embodiment, a timeline may include one or more continuous statistical time periods, each statistical time period comprising N continuous sub-statistical time periods, in which N is an integer. The predetermined storage object may include N sub-storage objects, each sub-storage object storing resource consumption data associated with one sub-statistical time period.

In a variation of this embodiment, accumulating the resource consumption data in a predetermined storage object within a statistical time period corresponding to the service object may include determining a sub-statistical time period to which the resource consumption data pertains. The system may also accumulate the resource consumption data in a sub-storage object corresponding to a current sub-statistical time period when the resource consumption data pertains to the current sub-statistical time period.

In a further variation, accumulating the resource consumption data in a predetermined storage object within a statistical time period corresponding to the service object may further include assigning a second sub-storage object to the sub-statistical time period when the resource consumption data pertains to a next sub-statistical time period. The system may also update the resource consumption data in the second sub-storage object.

In a further variation, the resource consumption data is associated with a push timestamp and the sub-storage object is associated with one or more statistical timestamps. Determining a sub-statistical time period to which the resource consumption data pertains may include calculating a first time difference between the push timestamp and a most recent statistical timestamp. The system may determine whether the first time difference is greater than a statistical time threshold. If the first time difference is greater than the statistical time threshold, the system may determine that the resource consumption data pertains to the next sub-statistical time period. If the first time difference is not greater than the statistical time threshold, the system may determine that the resource consumption data pertains to the current sub-statistical time period.

In a variation on this embodiment, accumulating the resource consumption data in a predetermined storage object within a statistical time period corresponding to the service object may further include setting the push timestamp associated with the resource consumption data as a statistical timestamp.

In a variation on this embodiment, sorting the resource consumption data accumulated in the predetermined storage object within an update time period corresponding to the service object may include determining an update time period to which the resource consumption data pertains. The system may also write the resource consumption data accumulated in the storage object within an update time period corresponding to the service object to a service statistics table corresponding to the resource consumption data when the resource consumption data pertains to a next update time period. The system may then obtain resource consumption data which is at the beginning of the sort order from the service statistics table.

In a variation of this embodiment, the resource consumption data is associated with a push timestamp and the predetermined storage object is associated with one or more update timestamps. Determining an update time period to which the resource consumption data pertains may include calculating a second time difference between the push timestamp and a most recent update timestamp. The system may then determine whether the second time difference is greater than an update time threshold. If the second time difference is greater than the update time threshold, the system may determine that the resource consumption data pertains to the next update time period. If the second time difference is not greater than the update time threshold, the system may determine that the resource consumption data pertains to the current update time period.

In a variation on this embodiment, writing the resource consumption data may further include calculating a sum of the resource consumption data accumulated in a sub-storage object corresponding to a sub-statistical time period of the update time period corresponding to the service object. The system may also write the sum of the accumulated resource consumption data in the service statistics table corresponding to the resource consumption data.

In a variation on this embodiment, sorting the resource consumption data accumulated in the predetermined storage object within an update time period corresponding to the service object may further include setting a push timestamp associated with the resource consumption data as an update timestamp.

In a variation on this embodiment, the system may store a sample object in a kernel layer. The sample object may include one or more service statistics tables, with a respective sort result recorded in a respective service statistics table. Loading the sorted resource consumption data may include reading the sample object located in the kernel layer by using a predetermined interface at an application layer to obtain data from one or more service statistics tables. The system may also display resource consumption data which is located at the beginning of the sort order from one or more service statistics tables.

In a variation on this embodiment, the system may reside the predetermined storage object in a memory during a hot upgrade. The system may also unregister a sample object corresponding to the service object and one or more service statistics tables included in the sample object, in which a sort result is recorded in the service statistics table.

BRIEF DESCRIPTION OF THE DRAWINGS

The accompanying drawings described herein are used for further understanding the present application and constitute a part of the present application, and the schematic embodiments of the present application and the descriptions thereof are used for interpreting the present application, rather than improperly limiting the present application. In which.

DETAILED DESCRIPTION OF EMBODIMENTS

Embodiments of the present invention solve the problem of collecting statistics for a service object by collecting and accumulating the service object's resource consumption data in a storage object, sorting and loading the resource consumption data, and then displaying the sort results. Service objects can be, for example, network connections or processes. Resource consumption data can include data indicating device resource usage, such as network traffic, CPU usage, and memory usage. A service object monitoring system as disclosed herein can accumulate and sort resource consumption data within different time intervals, and use timestamps to determine which time interval the resource consumption data belongs to. The system can then display the sorted resource consumption data associated with a particular time interval.

The system can collect and display resource consumption data without using a timer, which is more efficient than traditional approaches. The system can operate lock-free when collecting and sorting statistics, and the system is also flexible in that the system can adjust the time intervals for accumulating and sorting resource consumption data. The system can also concurrently collect statistics, which allows the system to collect large amounts of data efficiently with reduced consumption of resources.

Exemplary Monitoring Method for a Service Object

Figure 1:
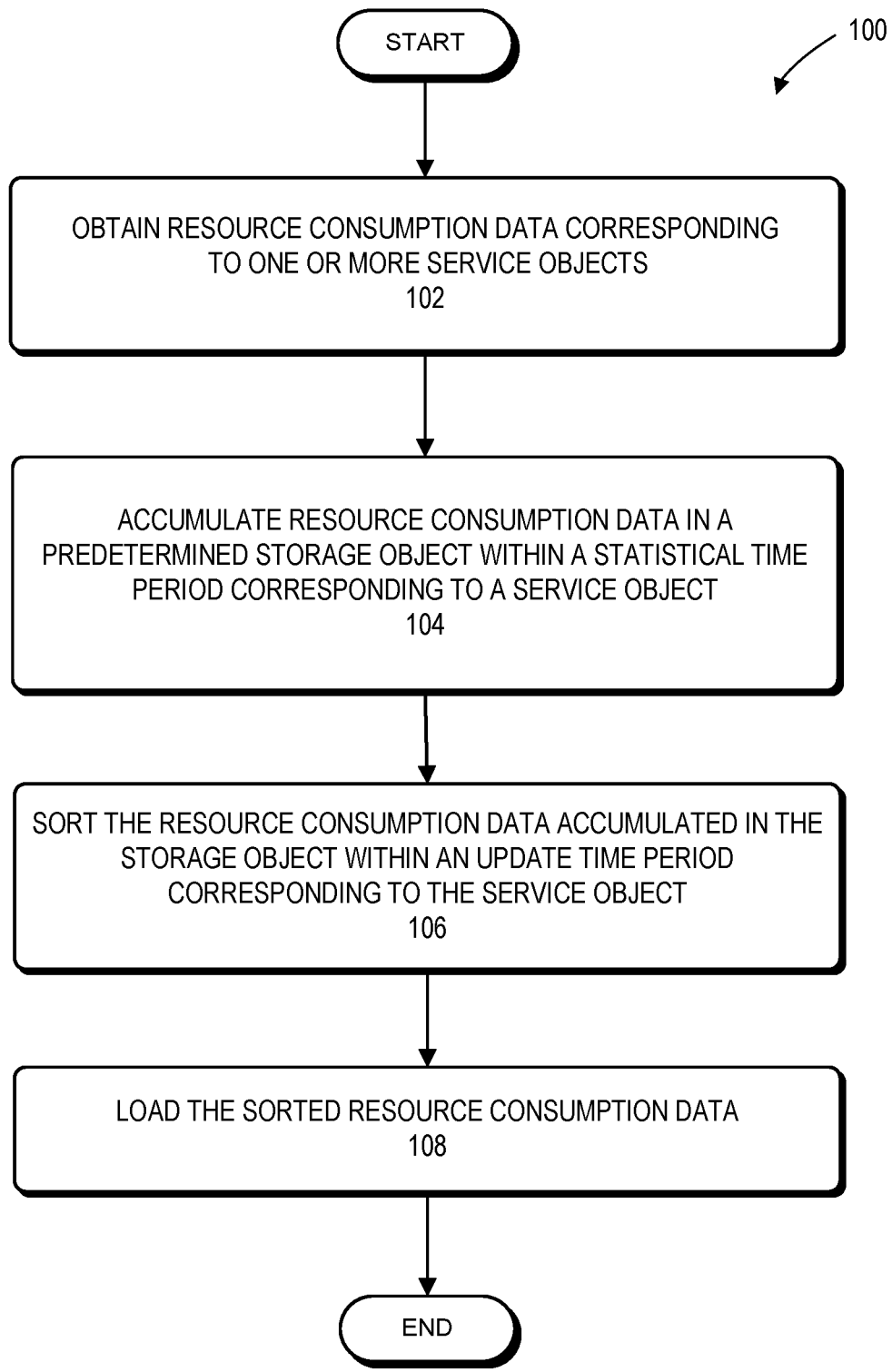
FIG. 1 presents a flowchart illustrating an overview of a monitoring method for a service object, in accordance with an embodiment of the present invention.

FIG. 1 presents a flowchart 100 illustrating an overview of a monitoring method for a service object, in accordance with an embodiment of the present invention. During operation, the system may obtain resource consumption data corresponding to one or more service objects (operation 102). The system may accumulate resource consumption data in a predetermined storage object within a statistical time period corresponding to a service object (operation 104). The system may sort the resource consumption data accumulated in the storage object within an update time period corresponding to the service object (operation 106). The system may then load the sorted resource consumption data (operation 108). The details of performing the operations illustrated in the overview of FIG. 1 are described below with reference to the components of FIG. 2.

Schematic Diagram of Layered Architecture

Figure 2:
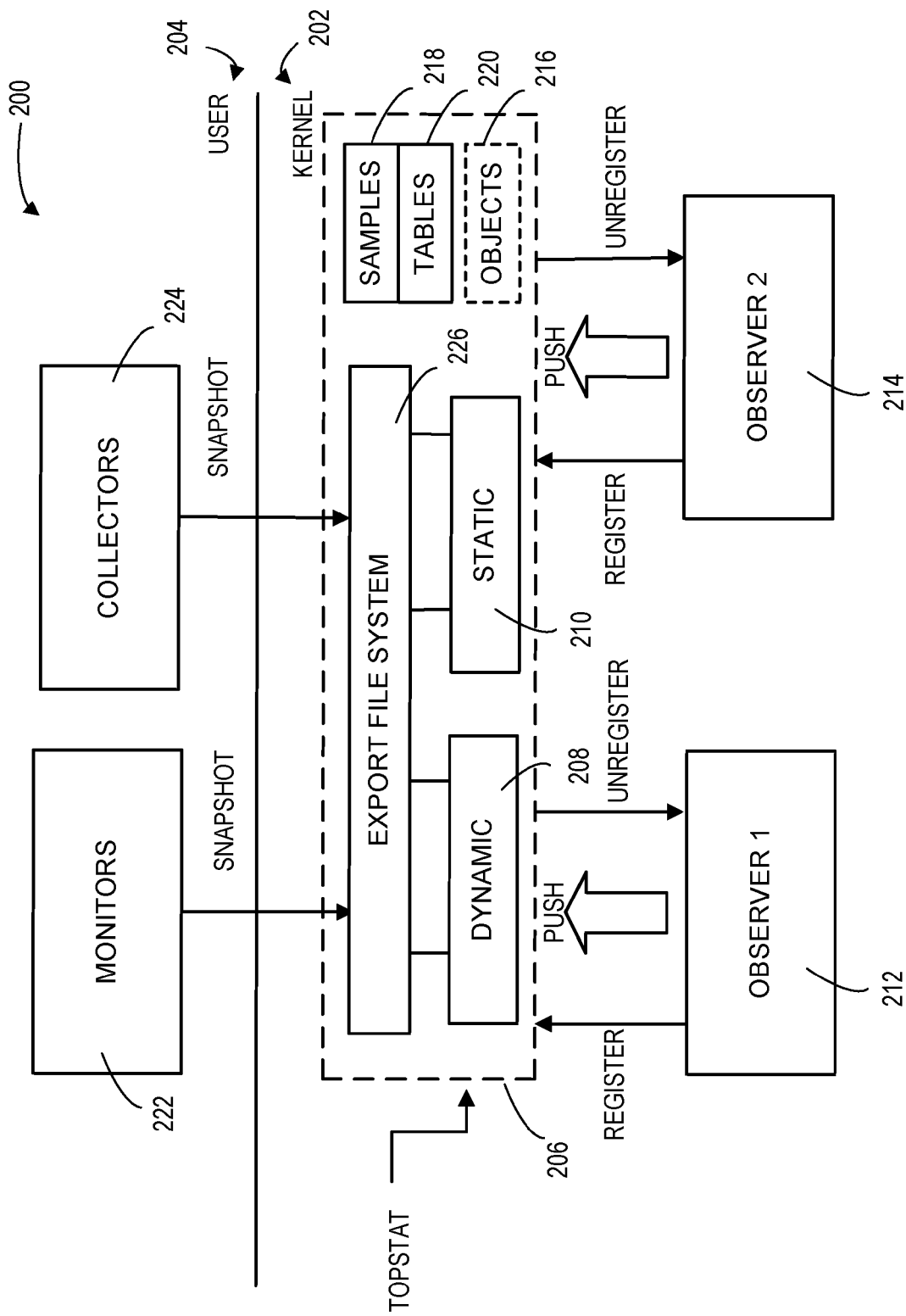
FIG. 2 is a schematic diagram illustrating a layered architecture of a system for monitoring service object information, in accordance with an embodiment of the present invention.

FIG. 2 is a schematic diagram illustrating a layered architecture 200 of a system for monitoring service object information, in accordance with an embodiment of the present invention. Embodiments of the present application may apply to a layered architecture that includes a kernel layer 202 (e.g., Kernel) and an application layer 204 (e.g., User). The kernel may be a kernel of different operating systems, examples of which include *nux (e.g., different variations of linux operating system) and *bsd (e.g., different variations of Berkeley Software Distribution (BSD) operating system).

In kernel layer 202, a statistics module 206 (e.g., Topstat) may be configured to collect statistics for service objects (e.g., connections and processes) according to service requirements (e.g., memory, traffic, and CPU resources), and support concurrent operations. Specifically, the system may concurrently perform operations 102, 104, and 106.

In statistics module 206, a dynamic statistics module 208 (e.g., Dynamic) may include code for executing a dynamic recall technique, and may be configured to collect statistics related to time. Specifically, the system may collect statistics in real-time in kernel layer 202 using the dynamic recall technique.

A static statistics module 210 (e.g., Static) may be configured to collect statistics without regards to time, including, for example, e.g., the total number of received packets.

The system may obtain resource consumption data corresponding to one or more service objects (operation 102). In some embodiments, the system may obtain resource consumption data through an observer component, such as one of observer components 212, 214 (e.g., Observer 1 and/or Observer 2 in FIG. 2), involved when applying a service object. The resource consumption data may include data indicating device resource usage (e.g., traffic, CPU, memory) when using the service object. Note that the disclosure below describes descriptions and operations for observer component 212, but the descriptions and operations also apply to observer component 214.

An observer component 212 may be a subsystem (e.g., sub-module) of the service object for which the system is collecting statistics. Observer component 212 can be a kernel subsystem, and can also be another service module that uses statistics module 206 in the kernel layer 202.

For example, when collecting statistics for connection traffic, observer component 212 is equivalent to a network submodule in the kernel layer 202, such as a Transmission Control Protocol (TCP) stack, which includes management and other information related to the connection. The resource consumption data may be, for example, the number of received data packets (e.g., delta), the size of the packet, or the size of the delay. As another example, for CPU resources, the resource consumption data may indicate disk I/O, and for memory, the resource consumption data may indicate a read/write speed.

Observer component 212 may access statistics module 206 by registering when observer component 212 is installed. Observer component 212 may push resource consumption data (such as the packet statistics data described above) to statistics module 206, and withdraw from statistics module 206 by unregistering when observer component 212 is uninstalled.

Note that one may set a frequency for pushing the resource consumption data based on actual needs, and regulate (e.g., adjust) the statistics collection speed according to the push frequency of the resource consumption data. In this way, the system can increase the speed for collecting statistics by increasing the push frequency of the resource consumption data, and can also reduce the statistics collection speed by decreasing the push frequency of the resource consumption data.

For example, when the system receives a data packet via a connection, observer component 212 may push one unit of resource consumption data. Observer component 212 may also accumulate data until a threshold is reached before pushing out the data. For example, observer component 212 may push when the data reaches a threshold of 100 units of resource consumption data.

Under normal circumstances, the system constantly uses a service object, and the corresponding resource consumption data is continuous. In some embodiments, the system can obtain resource consumption data for multiple service objects concurrently, and the system may continuously obtain multiple resource consumption data for a single service object.

The system may accumulate resource consumption data in a predetermined storage object 216 within a statistical time period corresponding to the service object (operation 104).

As illustrated in FIG. 2, when the system loads observer component 212, the system registers storage object 216 for observer component 212 in kernel layer 202.

The storage object 216 may store context information such as each service object's history information, statistical timestamp, and accumulated value.

In some embodiments, the system may set a statistical time period for collecting statistics for each type of service so as to accommodate different service requirements. The system may accumulate resource consumption data in a storage object 216 within the statistical time period.

The statistical time period is a logical unit of measurement, and can be a time range between any time points. One timeline may include one or more continuous statistical time periods.

Exemplary Timeline with Continuous Statistical Time Periods

Figure 3:
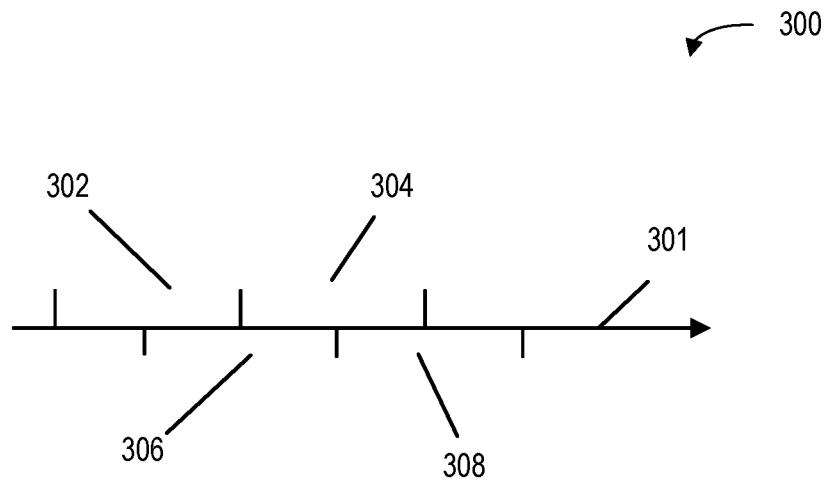
FIG. 3 presents a diagram illustrating an exemplary timeline with continuous statistical time periods, in accordance with an embodiment of the present invention.

FIG. 3 presents a diagram 300 illustrating an exemplary timeline with continuous statistical time periods, in accordance with an embodiment of the present invention. As illustrated in FIG. 3, a timeline 301 may include continuous statistical time periods, such as a statistical time period 302 and a statistical time period 304. Timeline 301 also includes continuous update time periods, such as update time period 306 and update time period 308. Statistical time periods are discussed below, and update time periods are discussed later in this disclosure. The system may accumulate resource consumption data of a service object within a corresponding statistical time period, and the system may sort the accumulated resource consumption data within a corresponding update time period.

In one implementation, each statistical time period may include N continuous sub-statistical time periods, where N is an integer. Storage object 216 may include N sub-storage objects, and one sub-storage object may store resource consumption data from one sub-statistical time period.

Storage object 216 may use an array such as a bitmap to implement a type of circular queue to store the resource consumption data of a sub-statistical time period. The resource consumption data stored for sub-statistical time periods in the storage object may pertain to the same statistical time period, or pertain to different statistical time periods.

Exemplary Timeline with Continuous Statistical Time Periods and Storage Object

Figure 4:
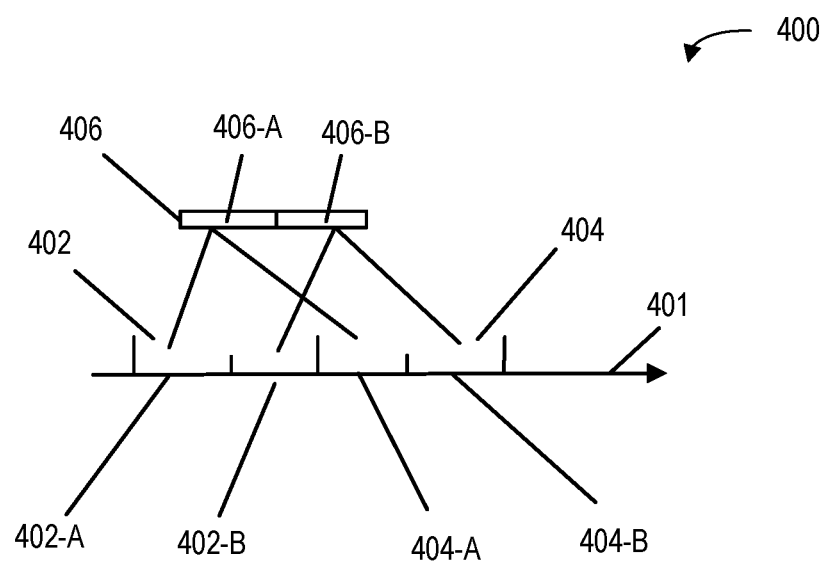
FIG. 4 presents a diagram illustrating an exemplary timeline with continuous statistical time periods and a storage object with sub-storage objects, in accordance with an embodiment of the present invention.

FIG. 4 presents a diagram 400 illustrating an exemplary timeline 401 with continuous statistical time periods and a storage object with sub-storage objects, in accordance with an embodiment of the present invention. As illustrated in FIG. 4, the statistical time period 402 may include continuous sub-statistical time periods such as a sub-statistical time period 402-A and a sub-statistical time period 402-B. The statistical time period 404 may include continuous sub-statistical time periods such as a sub-statistical time period 404-A and a sub-statistical time period 404-B.

A storage object 406 may include a sub-storage object 406-A and a sub-storage object 406-B. Sub-storage object 406-A may store the resource consumption data of any time period of sub-statistical time period 402-A, sub-statistical time period 402-B, sub-statistical time period 404-A, and sub-statistical time period 404-B. Sub-storage object 406-B may also store the resource consumption data of any time period of sub-statistical time period 402-A, sub-statistical time period 402-B, sub-statistical time period 404-A, and sub-statistical time period 404-B.

In addition, a person skilled in the art may adjust the quantity of sub-storage objects in the storage object according to actual requirements, in order to adapt to the requirements for statistical accuracy of different services.

Sub-Operations for Accumulating Resource Consumption Data

Figure 5:
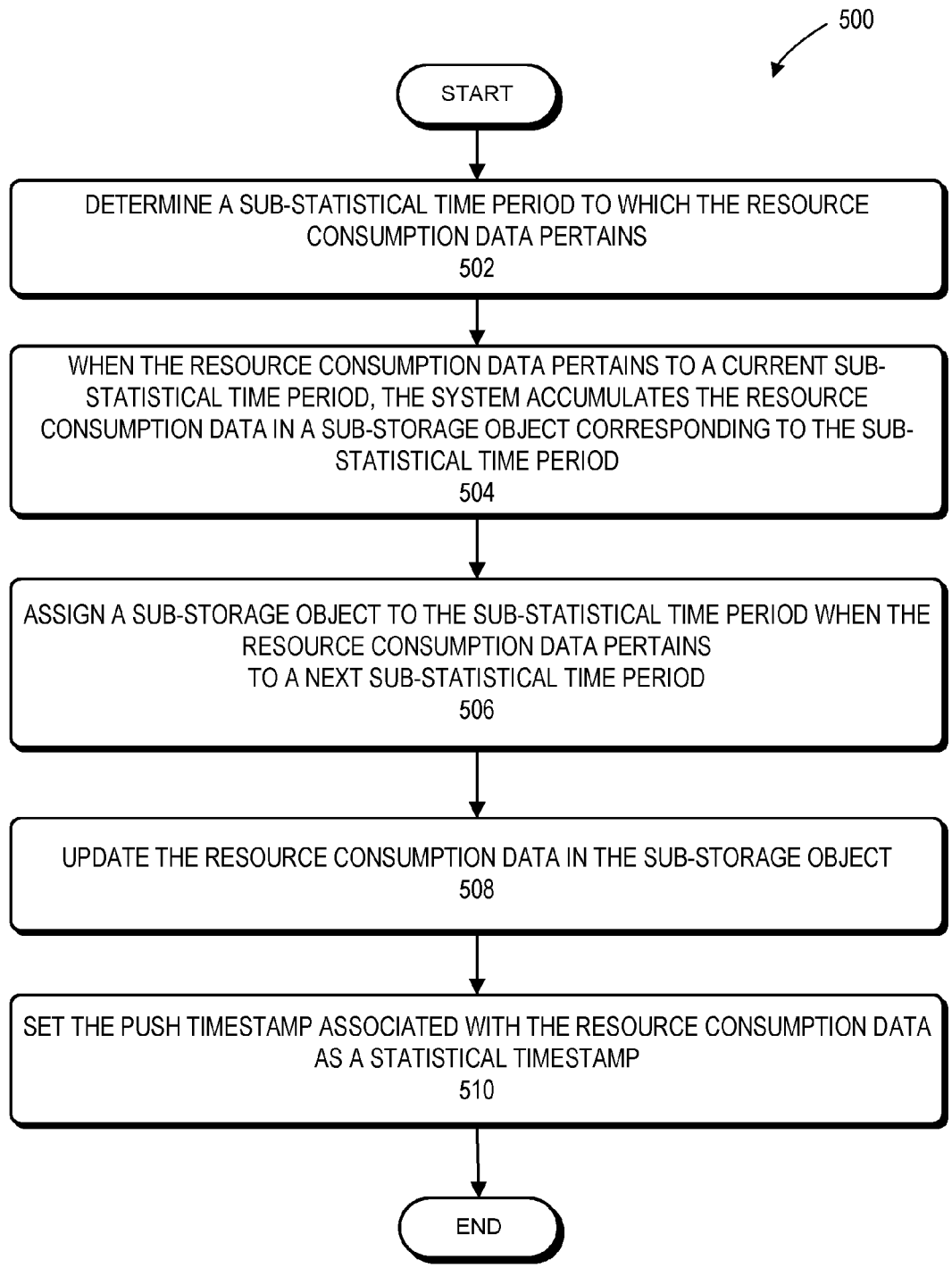
FIG. 5 presents a diagram illustrating sub-operations for accumulating resource consumption data in a predetermined storage object, in accordance with an embodiment of the present invention.

FIG. 5 presents a diagram illustrating sub-operations of operation 104 for accumulating resource consumption data in a predetermined storage object, in accordance with an embodiment of the present invention. These sub-operations may include determining a sub-statistical time period to which the resource consumption data pertains (operation 502). When the resource consumption data pertains to a current sub-statistical time period, the system may accumulate the resource consumption data in a sub-storage object corresponding to the sub-statistical time period (operation 504). The system may assign the sub-statistical time period to a sub-storage object when the resource consumption data pertains to a next sub-statistical time period (operation 506). The system may then update the resource consumption data in the sub-storage object (operation 508). The system may set the push timestamp associated with the resource consumption data as a statistical timestamp (operation 510). These sub-operations of operation 104 of FIG. 1 are further described below.

The system may determine a sub-statistical time period to which the resource consumption data pertains (operation 502).

In some embodiments, the system may accumulate resource consumption data using a finer scale sub-statistical time period, which is capable of smoothing the accumulated resource consumption data. This improves statistical accuracy, and avoids instances where the data abruptly increases or decreases with the sliding of the statistical window.

In some embodiments, the resource consumption data may be associated with a push timestamp and a sub-storage object may store an associated statistical timestamp.

The system may add the push timestamp (e.g., generate and apply the timestamp) when pushing the resource consumption data. The system can also add the push timestamp when receiving the resource consumption data.

The system may add the statistical timestamp when writing the resource consumption data to the sub-storage object for the first time. The statistical timestamp may indicate an end time of a previous sub-statistical time period and/or a start time of a current sub-statistical time period.

Sub-Operations for Determining a Sub-Statistical Time Period

Figure 6:
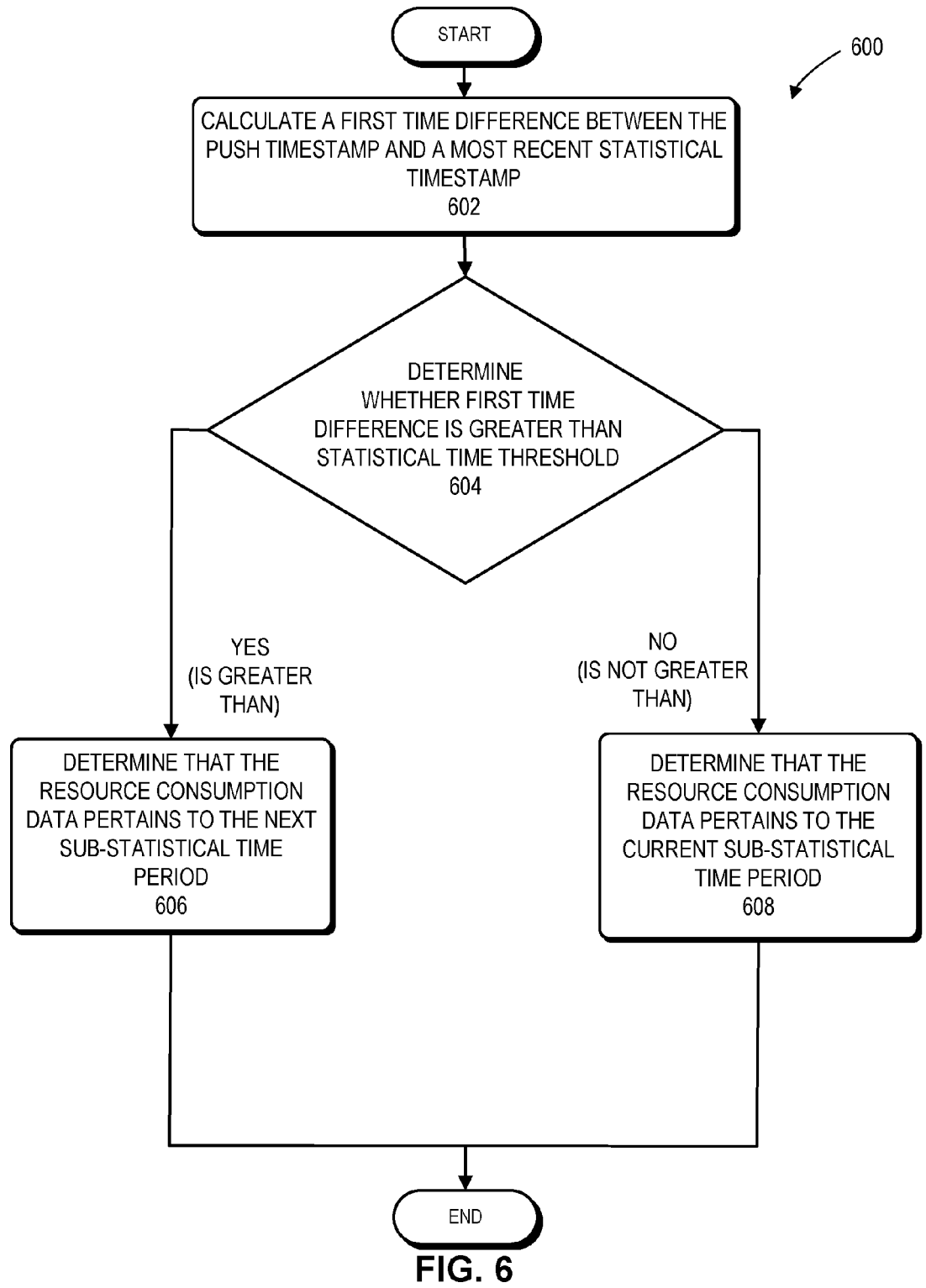
FIG. 6 presents a diagram illustrating sub-operations for determining a sub-statistical time period to which resource consumption data pertains, in accordance with an embodiment of the present invention.

FIG. 6 presents a diagram 600 illustrating sub-operations of operation 502 for determining a sub-statistical time period to which resource consumption data pertains, in accordance with an embodiment of the present invention. In this example, operation 502 may include the sub-operations described below:

The system may calculate a first time difference between the push timestamp and a most recent statistical timestamp (operation 602).

The system may determine whether the first time difference is greater than a statistical time threshold (operation 604). The statistical time threshold can be equal to a length of time of the sub-statistical time period. If the first time difference is greater than the statistical time threshold, then the system may perform operation 606. If not, then the system may perform operation 608.

The system may determine that the resource consumption data pertains to the next sub-statistical time period (operation 606).

The system may determine that the resource consumption data pertains to the current sub-statistical time period (operation 608).

Using a Linux system as an example, the system may calculate a timestamp by using jiffies, and the system may update jiffies during timer interrupt processing. The global variable jiffies holds the number of ticks since the system booted. On boot, the kernel initializes the variable to zero, and increments the variable by one during each timer interrupt.

Assume that the system increases jiffies by 1 for each millisecond. The system may convert a statistical timestamp to jiffies. The jiffies of a sub-statistical time period is equivalent to 10, and the statistical time threshold is 10 ms. During the determination operation, the system may compare the most recent statistical timestamp with the current push timestamp so as to determine whether the difference is less than or equal to 10. If the difference is less than or equal to 10, it indicates that the resource consumption data is within a sub-statistical time period corresponding to the most recent statistical timestamp, e.g., within the current sub-statistical time period. Otherwise the resource consumption data is for a sub-statistical time period adjacent to the current sub-statistical time period, e.g., within a next sub-statistical time period.

For example, as illustrated in FIG. 4, the sub-statistical time period 402-A may be associated with the most recent statistical timestamp, and the difference between the most recent statistical timestamp and the push timestamp of the current resource consumption data may be greater than the statistical time threshold. In this case, the current resource consumption data pertains to sub-statistical time period 402-B. Otherwise, the current resource consumption data pertains to sub-statistical time period 402-A.

When the resource consumption data pertains to a current sub-statistical time period, the system may accumulate the resource consumption data in a sub-storage object corresponding to the sub-statistical time period (operation 504).

If the resource consumption data pertains to the current sub-statistical time period, then the system may directly continue to accumulate data in the sub-storage object corresponding to the sub-statistical time period.

Note that the term "accumulate" refers to one way of accumulating, which may refer to a sub-storage object that already stores resource consumption data and the system accumulates current resource consumption data based on (or on top of) the previously stored resource consumption data.

For example, as illustrated in FIG. 4, the system may already store resource consumption data from sub-statistical time period 402-A in sub-storage object 406-A. If the current resource consumption data pertains to sub-statistical time period 402-A, the system may proceed to accumulate based on the resource consumption data stored in sub-storage object 406-A.

Operation 104 may further include the following sub-operations:

The system assigns a sub-storage object to the sub-statistical time period when the resource consumption data pertains to a next sub-statistical time period (operation 506). The system updates the resource consumption data in the sub-storage object (operation 508).

If the resource consumption data pertains to a next sub-statistical time period, the system may allocate a sub-storage object to the next sub-statistical time period. In one embodiment, there are two scenarios for allocating sub-storage objects. Under one scenario, the system assigns a new sub-storage object. That is, no resource consumption data is previously stored in the sub-storage object. Under this scenario, "update" is one way of performing the accumulation operation, which refers to the system directly writing current resource consumption data into the assigned sub-storage object.

For example, as illustrated in FIG. 4, the system may store resource consumption data associated with a sub-statistical time period in sub-storage object 406-A, and no resource consumption data is stored in sub-storage object 406-B. If the current resource consumption data pertains to sub-statistical time period 402-B, the system may assign sub-storage object 406-B to sub-statistical time period 402-B, and the system may directly write the initial resource consumption data into sub-storage object 406-B.

Under another scenario, the system may assign a previously used sub-storage object. That is, the system has previously stored resource consumption data in the sub-storage object. The previously used sub-storage object may be (e.g., based on statistical timestamp) the oldest sub-storage object. That is, within a previous statistical time period, the order of a sub-statistical time period is less than or equal to a sub-statistical time period of a next sub-statistical time period.

Under this scenario, "update" is also one way of performing an accumulation operation. Update may refer to deleting the previously accumulated resource consumption data stored in the sub-storage object and writing the current resource consumption data. Alternatively, the system may write the current resource consumption data into the sub-storage object to replace the previously accumulated resource consumption data.

For example, as illustrated in FIG. 4, the system may already store resource consumption data from sub-statistical time period 402-A in sub-storage object 406-A. Also, the system may already store resource consumption data from sub-statistical time period 402-B in sub-storage object 406-B. If the current resource consumption data pertains to sub-statistical time period 404-A, the system may allocate sub-storage object 406-A to sub-statistical time period 404-A. The system may update the current resource consumption data into sub-storage object 406-A, replacing the resource consumption data from sub-statistical time period 402-A.

Furthermore, if the current resource consumption data pertains to sub-statistical time period 404-B, the system may allocate sub-storage object 406-B to sub-statistical time period 404-B. The system may also update the current resource consumption data into sub-storage object 406-B to replace the resource consumption data from sub-statistical time period 402-B.

Operation 104 from FIG. 1 may further include the following sub-operations:

The system may set the push timestamp associated with the resource consumption data as a statistical timestamp (operation 510). If the system allocates a sub-storage object to a sub-statistical time period, the system may set the push timestamp of the current resource consumption data as the statistical timestamp, which the system may use to determine the sub-statistical time period pertaining to a subsequent resource consumption data.

The circular queue-type storage object described above is only an example. In some implementations, the system may set up other storage types based on actual conditions to store resource consumption data associated with a sub-statistical time period. In addition to the storage methods described above, a person skilled in the art may store the resource consumption data from the sub-statistical time period according to actual requirements.

The system may sort the resource consumption data accumulated in the storage object within an update time period corresponding to the service object (operation 106).

In some embodiments, in order to accommodate different service requirements, the system may set an update time period for the statistics of each type of service.

The update time period is a logical update unit. It can be a time range between any time points. One timeline may include one or more continuous update time periods.

Note that the statistical time period is typically greater than or equal to the update time period, and the statistical time period may intersect with the update time period.

As illustrated in FIG. 3, timeline 301 may include continuous statistical time periods, such as statistical time period 302 and statistical time period 304, and may also include continuous update time periods, such as update time period 306 and update time period 308.

Accumulating resource consumption data into the context of the storage object typically overwrites several fields with low operation workload and uses few resources. In contrast, sorting the accumulated resource consumption data uses operations such as sort, traverse, insert, and delete. Sorting uses more resources, and is more complicated than accumulating resource consumption data. Therefore, after setting an update time period, the system may greatly reduce the operation workload by regulating (e.g., making adjustments such as increasing) the update time period, and thereby greatly reducing resource consumption. Note that sometimes the connection traffic is great, and increasing the update time period does not substantially affect the accuracy for collecting statistics.

Some service objects may not have a large amount of traffic. The system may even set the update time period to 0. That is, the system not only updates the storage object each time, the system also performs sorting.

Sub-Operations for Sorting Resource Consumption Data

Figure 7:
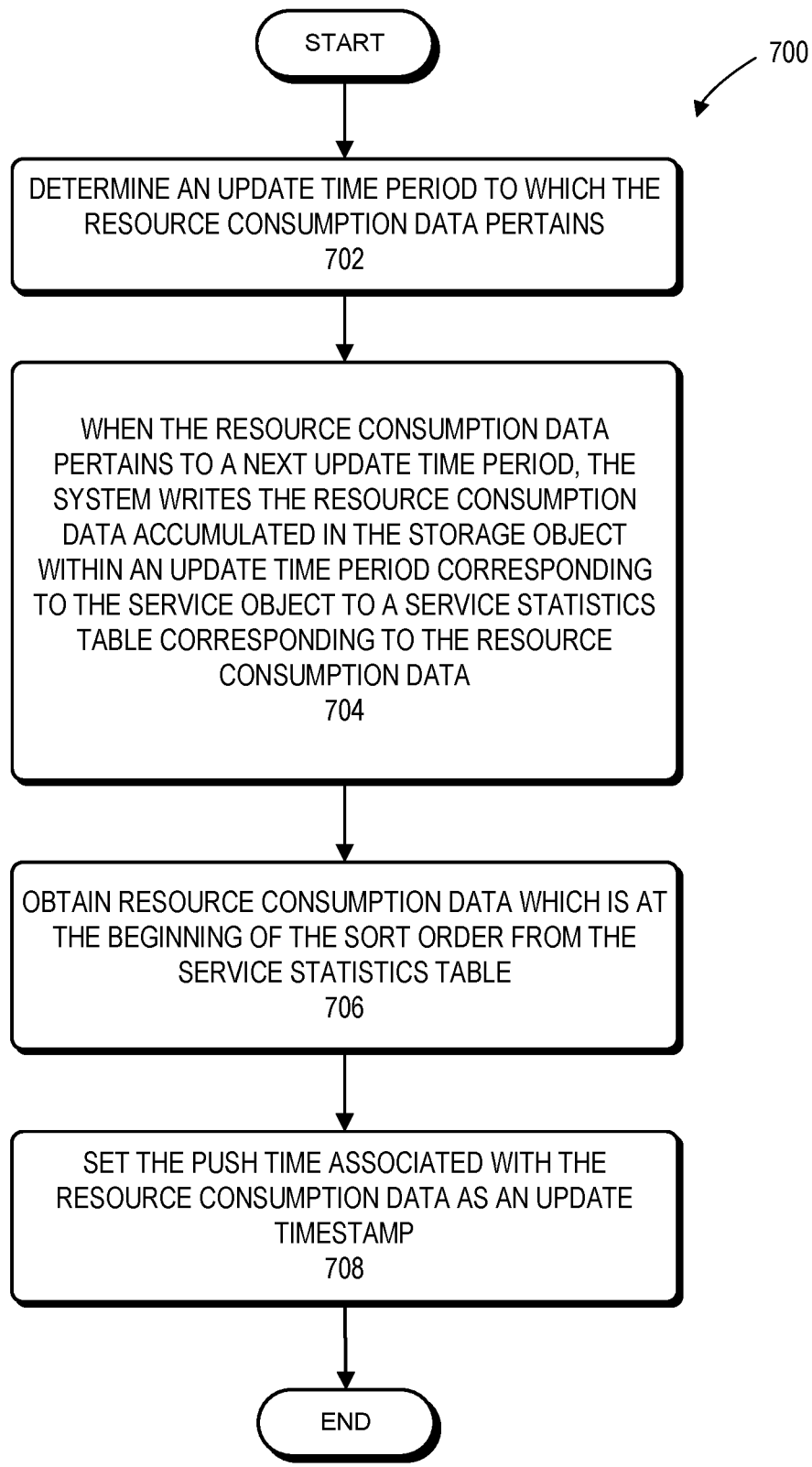
FIG. 7 presents a diagram illustrating sub-operations for sorting resource consumption data accumulated in a storage object within an update time period, in accordance with an embodiment of the present invention.

FIG. 7 presents a diagram illustrating sub-operations of operation 106 for sorting resource consumption data accumulated in a storage object within an update time period, in accordance with an embodiment of the present invention. These sub-operations may include determining an update time period to which the resource consumption data pertains (operation 702). When the resource consumption data pertains to a next update time period, the system writes the resource consumption data accumulated in the storage object within an update time period corresponding to the service object to a service statistics table corresponding to the resource consumption data (operation 704). The system may obtain resource consumption data which is at the beginning of the sort order from the service statistics table (operation 706). The system may then set the push time associated with the resource consumption data as an update timestamp (operation 708). These sub-operations of operation 106 of FIG. 1 are further described below.

The system determines an update time period to which the resource consumption data pertains (operation 702).

Each update time period represents a new update cycle. In the current update cycle, the system may continuously accumulate resource consumption data into the storage object. The system does not yet sort the resource consumption data accumulated in the storage object. If the current update cycle ends, the system may then sort the resource consumption data accumulated in the storage object.

In some embodiments, the resource consumption data may be associated with a push timestamp and the storage object may include an associated update timestamp.

The system may add the update timestamp when sorting the resource consumption data in the storage object. The update timestamp may represent an end time of a preceding update time period and/or an initial (e.g., beginning) time of the current update time period.

Sub-Operations for Determining an Update Time Period

Figure 8:
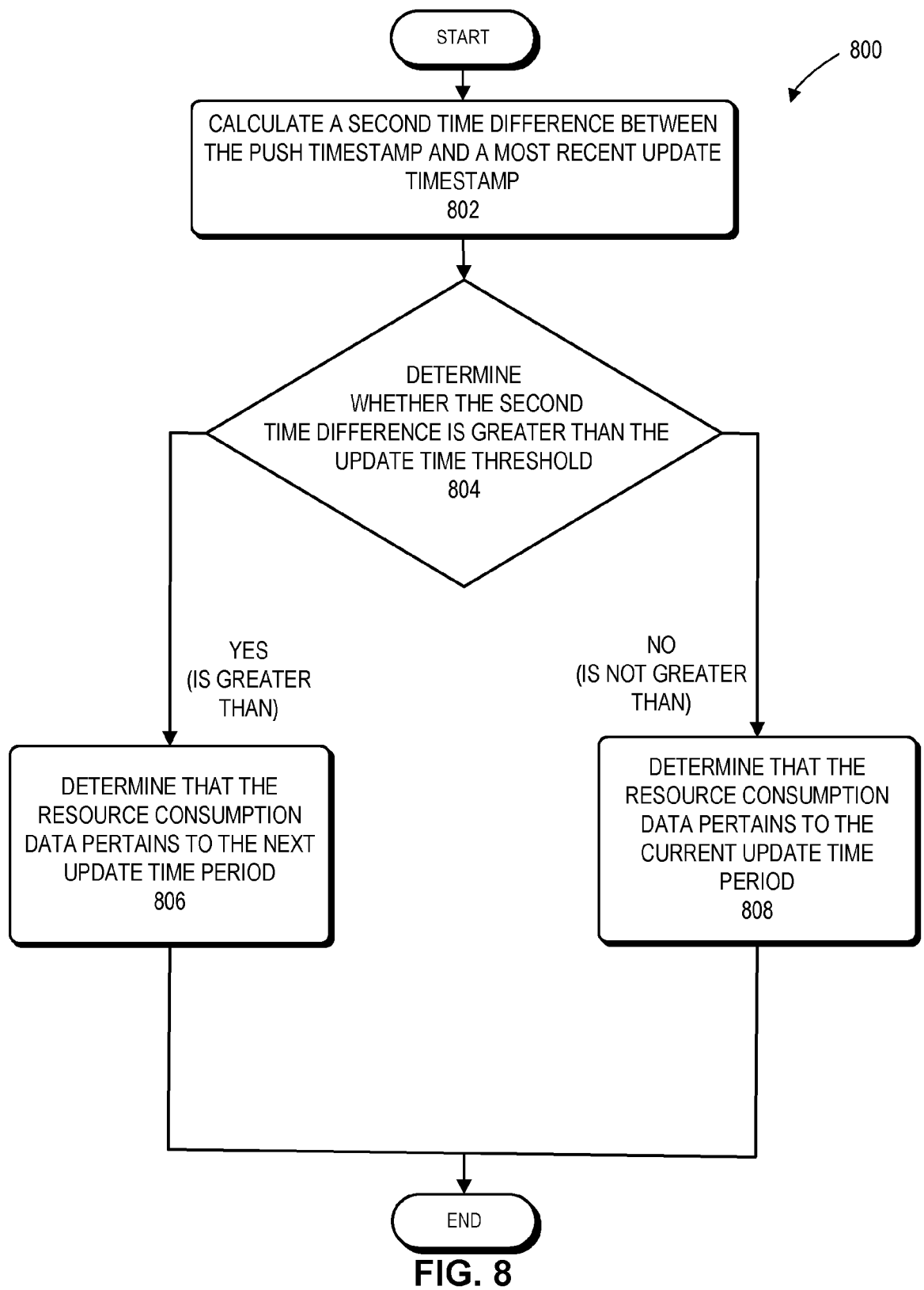
FIG. 8 presents a diagram illustrating sub-operations for determining an update time period to which resource consumption data pertains, in accordance with an embodiment of the present invention.

FIG. 8 presents a diagram illustrating sub-operations of operation 702 for determining an update time period to which resource consumption data pertains, in accordance with an embodiment of the present invention. In this example, operation 702 may include the sub-operations described below:

The system may calculate a second time difference between the push timestamp and a most recent update timestamp (operation 802).

The system may determine whether the second time difference is greater than the update time threshold (operation 804). The update time threshold can be equal to the value of the update time period. If the second time difference is greater than the update time threshold, the system may perform operation 806. Otherwise, the system may perform operation 808.

The system may determine that the resource consumption data pertains to the next update time period (operation 806).

The system may determine that the resource consumption data pertains to the current update time period (operation 808).

Using a Linux system as an example, the system may calculate the timestamp by using jiffies (e.g., a global variable), and the system may update jiffies during timer interrupt processing.

Assume that the system may increase jiffies by 1 each millisecond. The system may convert an update timestamp into jiffies, and the jiffies of an update time period is equivalent to 100, e.g., the update time threshold is 100 ms. Then, during the determination operation, the system may compare the most recent statistical timestamp with the current push timestamp so as to determine whether the difference is less than or equal to 100. If the difference is less than or equal to 100, this indicates that the resource consumption data is associated with an update time period corresponding to the most recent update timestamp. Otherwise the resource consumption data is associated with an update time period adjacent to the current update time period, e.g., within a next update time period.

If the current resource consumption data pertains to the current update time period, this indicates that the data is still within the current update cycle. If the current resource consumption data pertains to a next update time period, this indicates that the current update cycle ends.

When the resource consumption data pertains to a next update time period, the system may write the resource consumption data accumulated in the storage object within an update time period corresponding to the service object to a service statistics table corresponding to the resource consumption data (operation 704).

The system may obtain resource consumption data which is at the beginning of the sort order from the service statistics table (operation 706).

As illustrated in FIG. 2, in the kernel layer, a sample object 218 (e.g., Samples) may correspond to statistics associated with a set of service objects, e.g., sorted traffic from a virtual machine to another virtual machine.

The service statistics table 220 (e.g., Tables) conceptually pertains to a sample (e.g., a sample object). To be specific, one sample object may include one or more service statistics tables. For example, one service statistics table may include data sorted based on the number of packets per second, and another service statistics table may include data sorted based on the number of bytes per second.

The system may set an update time period for each service statistics table according to service statistics requirements.

In some implementations, the service statistics table may be implemented as a red-black tree, or other data structure used for statistics, and the type of data structure is not limited in the embodiments of the present application.

In some embodiments, when an observer component calls a push interface to push the resource consumption data, the push interface may include an identifier (e.g., a pointer) of the service statistics table from when the observer component is created. The system may perform sorting and update the corresponding service statistics table.

Under normal circumstances, the number of service statistics tables is finite. For example, if the system collects statistics for millions of connections, the system may write the traffic statistics of 100 connections into the service statistics table.

The system may write the resource consumption data accumulated in the storage object into the service statistics table corresponding to the resource consumption data, which may include the system updating the service statistics table with data from some fields of the storage object. If the value of the updated accumulated resource consumption data is greater than a minimum value of the service statistics table, the system may update a new value to the service statistics table at a suitable location. The system may also update other data fields of the storage object to the service statistics table, such as the description, the storage object, and the update timestamp.

Note that the term "sort" may indicate an ascending sort or a descending sort. For example, the system may collect statistics for the 100 connections with highest traffic out of millions of connections, or the system may collect statistics for the 100 connections with lowest traffic out of millions of connections.

Sub-Operations to Calculate and Write a Sum

Figure 9:
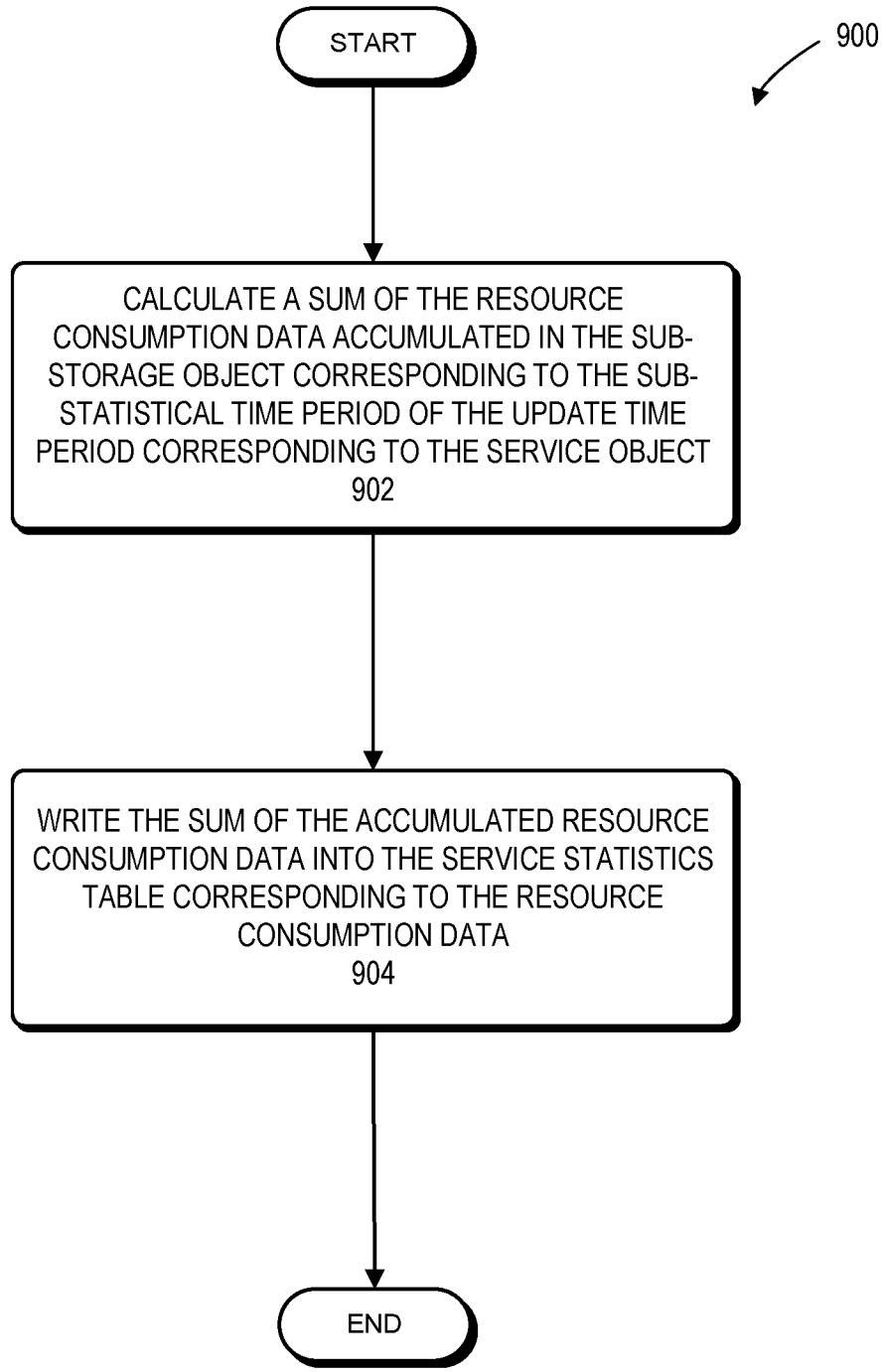
FIG. 9 presents a diagram illustrating sub-operations to calculate and write a sum of accumulated resource consumption data, in accordance with an embodiment of the present invention.

FIG. 9 presents a diagram illustrating sub-operations of operation 704 to calculate and write a sum of accumulated resource consumption data, in accordance with an embodiment of the present invention. In some embodiments, operation 704 may include the following sub-operations:

The system may calculate a sum of the resource consumption data accumulated in the sub-storage object corresponding to the sub-statistical time period of the update time period corresponding to the service object (operation 902).

The system may write the sum of the accumulated resource consumption data into the service statistics table corresponding to the resource consumption data (operation 904).

In some embodiments, if the system subdivides a statistical time period into multiple sub-statistical time periods, the system may use the accumulated resource consumption data pertaining to the sub-statistical time period of the update time period to update the service statistics table.

For example, as illustrated in FIG. 3 and FIG. 4, the update time period 306 may include sub-statistical time period 402-B and sub-statistical time period 404-A. The system may, during an update within the update time period 306, write a sum of the accumulated resource consumption data from sub-statistical time period 402-B and sub-statistical time period 404-A into the service statistics table.

In some embodiments, operation 106 may further include the following sub-operations:

The system may set the push time associated with the resource consumption data as an update timestamp (operation 708).

In some embodiments, if the system updates the service statistics table, the system may set a push timestamp of the current resource consumption data as an update timestamp, which the system may use to determine whether a subsequent resource consumption data is updated to the service statistics table.

The system may load the sorted resource consumption data (operation 108). In some implementations, the system may load the sorted resource consumption data for various purposes such as monitoring and detection.

In some embodiments, the system stores a sample object in the kernel layer. The sample object may include one or more service statistics tables, and the system may record a sort result in the service statistics tables.

Sub-Operations to Monitor and Display Resource Consumption Data

Figure 10:
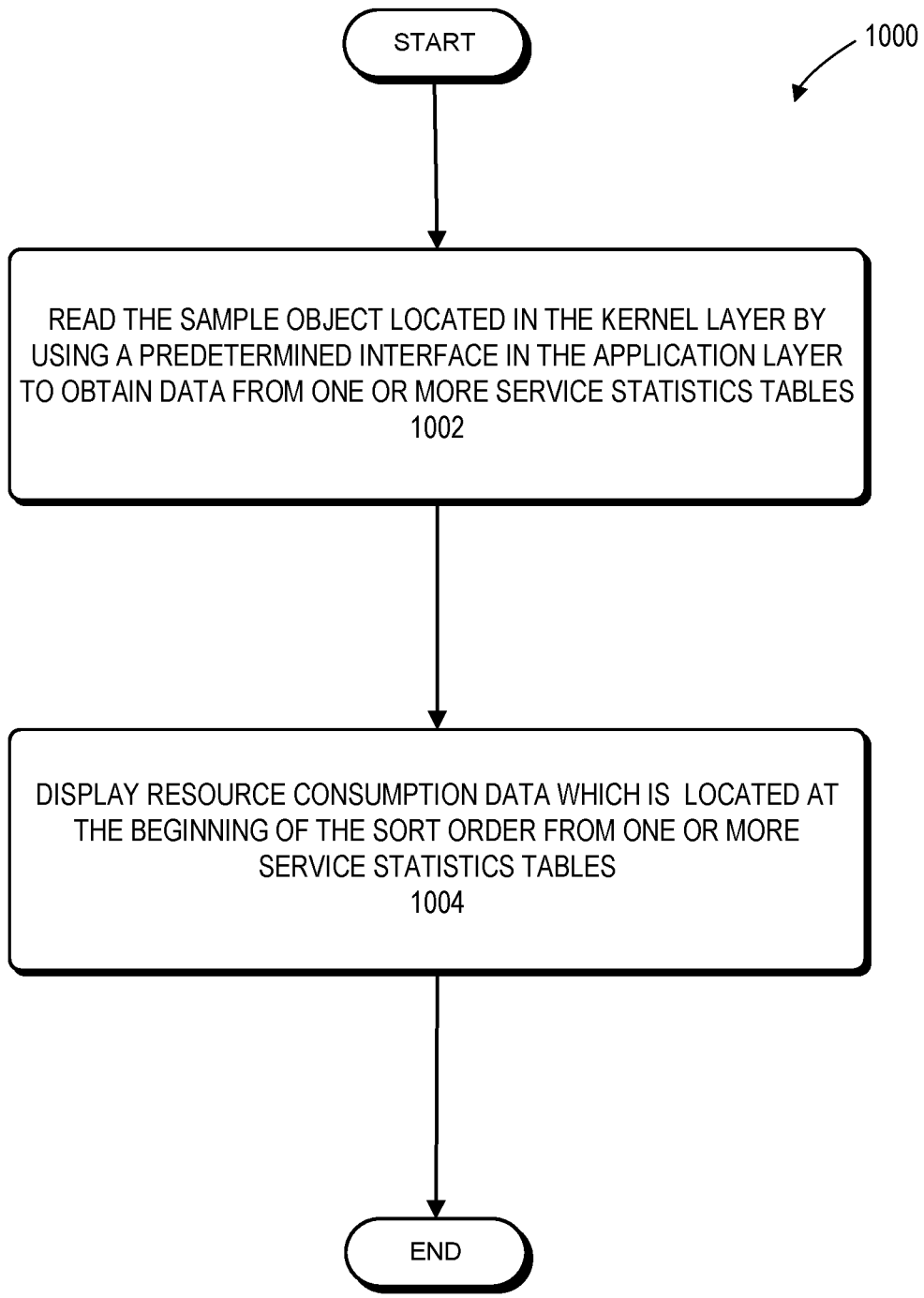
FIG. 10 presents a diagram illustrating sub-operations to load and display resource consumption data, in accordance with an embodiment of the present invention.

FIG. 10 presents a diagram illustrating sub-operations of operation 108 to monitor and display resource consumption data, in accordance with an embodiment of the present invention. In some embodiments, operation 108 may include the following sub-operations:

The system may read the sample object located in the kernel layer by using a predetermined interface at the application layer to obtain data from one or more service statistics tables (operation 1002).

The system may display resource consumption data which is located at the beginning of the sort order from one or more service statistics tables (operation 1004).

As illustrated in FIG. 2, the system (or an administrator) may configure various application modules such as a monitoring sub-system 222 (e.g., Monitors) and a collector 224 (e.g. Collectors) in the application layer.

An export file system 226 (e.g., Export File System) is a uniform interface for exporting statistical data. The kernel generally may expose a uniform interface to monitoring sub-system 222 in the upper layer via a sysfs interface or a proc interface.

Furthermore, the service statistics table may include a red-black tree of the proc interface, information regarding a specific storage object, and other parameters such as the update time period.

The proc interface is the interface for the service statistics table to externally export statistical data, and the monitoring sub-system may read in real time a file to display statistical information from the current table.

In the application layer, an application module may obtain the statistical data by directly reading a corresponding file from an export file system of the Topstat, such as sysfs/proc. This process is referred to as a snapshot. Reading files may trigger kernel threads to scan a statistical result on each CPU, and combine final statistical data (e.g., a result obtained based on the sort).

Both the sample object and the service statistics table have a corresponding directory or file in the export file system. Specifically, each service statistics table included in the sample object registered by the Topstat with respect to an observer component may have a file in the file system, and the system may immediately obtain the statistical data by reading the file. For example, the file may include information of each connection (e.g., an IP port, and a destination IP port), and a packets per second (pps) value of the connection.

Typically, the service statistics table is a sub-directory of the sample object. In addition, the sample object can expose, through snapshot, to the upper level monitoring system the final to-be-read file of the final statistical data (e.g., the sorting results).

In some embodiments, the system may collect statistical data based on the kernel layer. Specifically, the system may perform operations 102, 104, and 106 in the kernel layer. In some embodiments, the system may also collect the statistical data based on the application layer. Specifically, the system may perform operations 102, 104, and 106 in the kernel (and/or application) layer.

In some embodiments, the system may reside (e.g., store) the storage object in a memory during a hot upgrade. The system may also unregister the sample object corresponding to the service object and one or more service statistics tables included in the sample object, in which a sort result is recorded in the service statistics table.

Because the functionality of the product is constantly improving, in order avoid service interruptions, one generally performs hot upgrades for the service modules, e.g., upgrading without shutting down the machine. During the hot upgrade, the context information needed for collecting statistics included in the storage object will follow a service object's life cycle.

In some embodiments, because the statistical collection is separate from the main body of the service logic, the main service logic may also isolate the object for which statistics are being collected. This way the storage object may reside in the memory space during upgrade.

To be specific, each time the system loads an observer component, the system may register a corresponding sample object, service statistics table, and storage object.

During the hot upgrade, the system may remove the storage object from the main part of statistics module 206, and the system may unregister the corresponding sample object and service statistics table. At that moment, the context of the storage object is still present, and the system does not release the memory.

Unregistering may include calling an interface to instruct statistics module 206 to delete data structures of the corresponding sample object and service statistics table, and to clear the memory.

The upgraded service module may obtain the storage object information using a plug-like method, and obtain the context information needed for statistical collection. This information may include, for example, the statistical time period, the sub-statistical time period, the sum (e.g., the sum of the sub-statistical time period), the statistical timestamp, the update time period, the count (e.g., the number of times pushing resource consumption data), and the description information (e.g., a character string describing the storage object). The system may push the resource consumption data.

Exemplary Service Object Monitoring Apparatus

Figure 11:
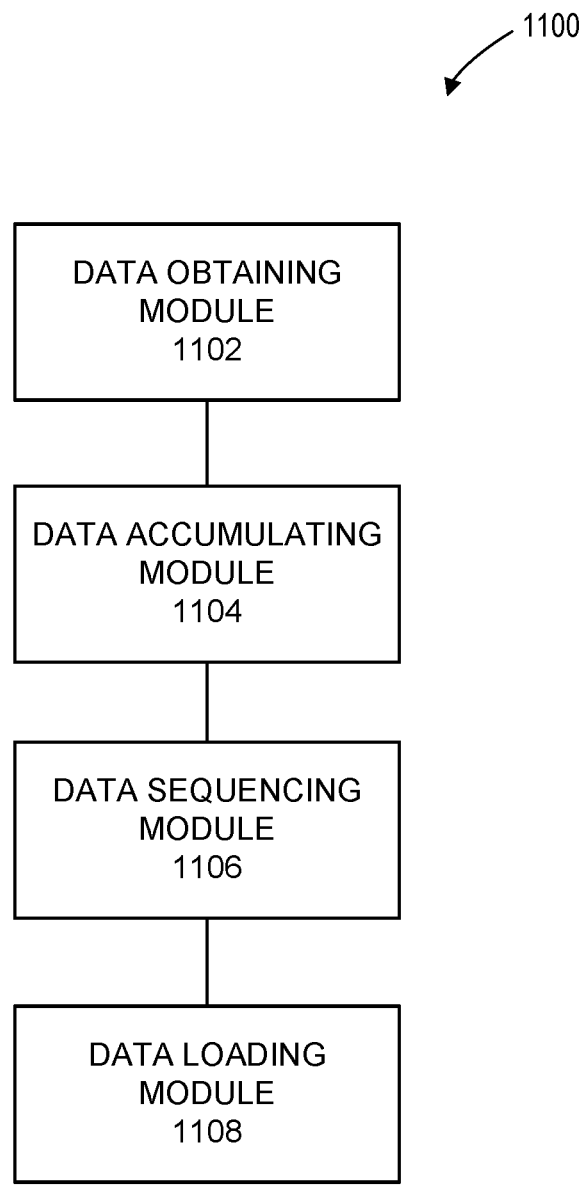
FIG. 11 presents a block diagram illustrating an exemplary service object monitoring apparatus, in accordance with an embodiment of the present application.

FIG. 11 presents a block diagram illustrating an exemplary service object monitoring apparatus 1100, in accordance with an embodiment of the present application. Apparatus 1100 may be, for example, a computing device executing the methods described herein. Apparatus 1100 can comprise a plurality of modules which may communicate with one another via a wired or wireless communication channel. Apparatus 1100 may be realized using one or more integrated circuits, and may include fewer or more modules than those shown in FIG. 11. Further, apparatus 1100 may be integrated in a computer system, or realized as a separate device which is capable of communicating with other computer systems and/or devices.

Note that apparatus 1100 may also include additional modules and data not depicted in FIG. 11, and different implementations may arrange functionality according to a different set of modules. Embodiments of the present invention are not limited to any particular arrangement of modules.

The apparatus may include a data obtaining module 1102, a data accumulating module 1104, a data sequencing module 1106, and a data loading module 1108.

Data obtaining module 1102 may be configured to obtain resource consumption data corresponding to one or more service objects. Data accumulating module 1104 may be configured to accumulate resource consumption data in a predetermined storage object within a statistical time period corresponding to a service object. Data sequencing module 1106 may be configured to sort the resource consumption data which has been accumulated in the storage object within an update time period corresponding to the service object. Data loading module 1108 may be configured to load the sorted resource consumption data.

Embodiments of the present application have the following advantages:

The system may accumulate resource consumption data of a service object within a corresponding statistical time period, and the system may sort the accumulated resource consumption data within a corresponding update time period.

First, there is no timer, and the system may perform traverse without interrupting context, which greatly reduces performance consumption.

Second, the system may push the resource consumption data according to the context of the service object in a lock-free mode. The sorting of the resource consumption data can be directed to a single processor with a lock-free structure, and the lock is a key factor affecting the performance. The lock-free collection of statistics greatly reduces performance consumption.

Third, the system may regulate (e.g., adjust) the storage time period and the update time period according to service requirements. That is, the system may adjust the effectiveness and frequency for collecting statistics. The system benefits from high flexibility for collecting statistics, and the disclosed techniques may be applicable to various service types and at the same time allow the entire performance consumption to be highly controllable. This prevents the uncontrolled overuse of resources, ensures the normal resource consumption of the service modules, and ensures the normal performance of the service modules.

Fourth, the system supports concurrent collection of statistics for the resource consumption data of the service object.

Based on the four points listed above, the embodiments of the present application are suitable for collecting statistics related to time for scenarios with large amounts of data, high concurrency, and high pressure.

In embodiments of the present application, during a hot upgrade, the system resides the storage object in the memory space and unregisters the sample object and service statistics table. This prevents the loss of the statistical information, avoids initialization of the statistics collecting logic, and reduces the time for the hot upgrade.

Exemplary Server

Figure 12:
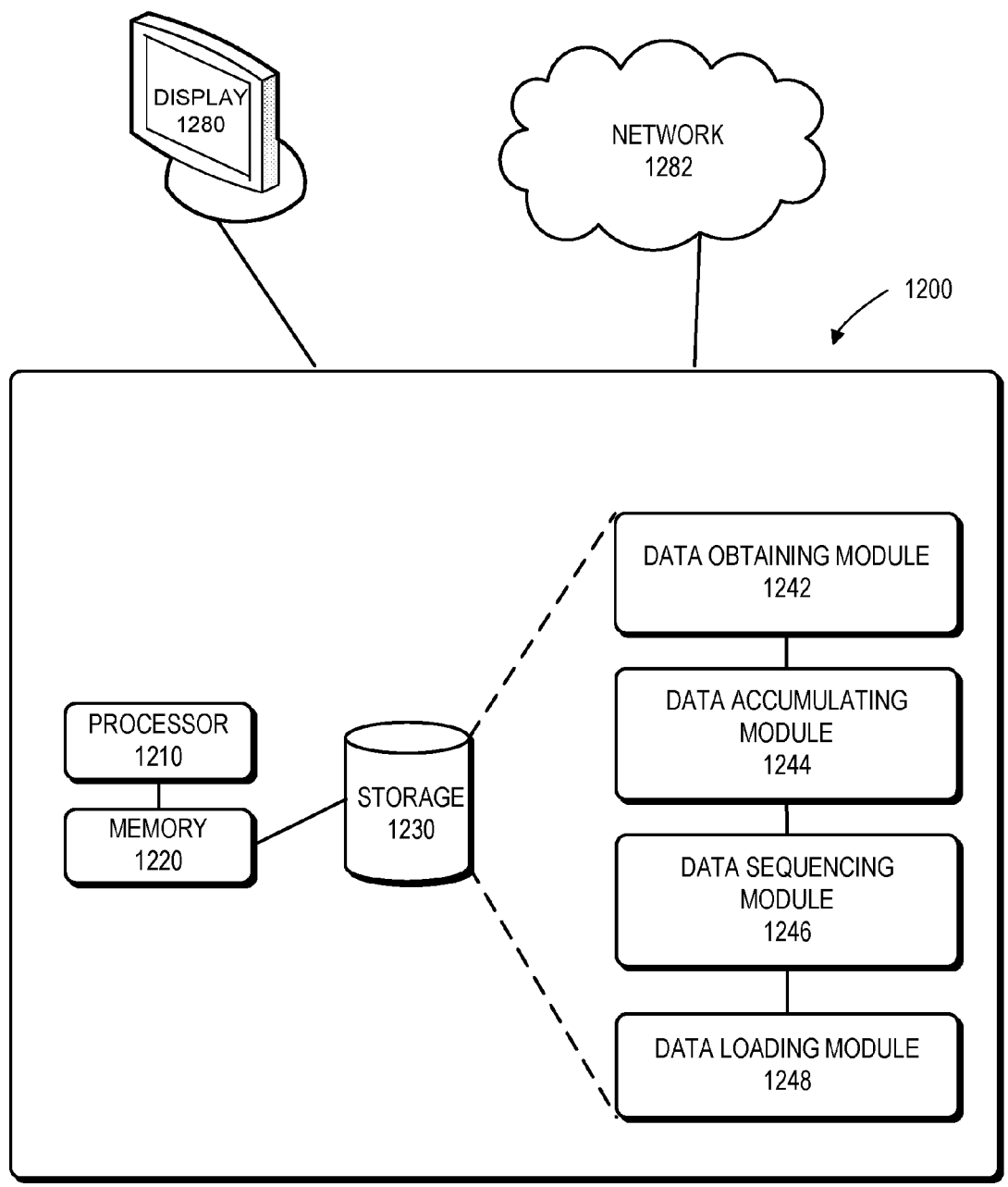
FIG. 12 presents a block diagram illustrating an exemplary server in a service object monitoring system, in accordance with an embodiment of the present application.

FIG. 12 presents a block diagram illustrating an exemplary server 1200 in a service object monitoring system, in accordance with an embodiment of the present application. Server 1200 includes a processor 1210, a memory 1220, and a storage device 1230. Storage 1230 typically stores instructions that can be loaded into memory 1220 and executed by processor 1210 to perform the methods described above. In one embodiment, the instructions in storage 1230 can implement a data obtaining module 1242, a data accumulating module 1244, a data sequencing module 1246, and a data loading module 1248, which can communicate with each other through various means.

In some embodiments, modules 1242-1248 can be partially or entirely implemented in hardware and can be part of processor 1210. Further, in some embodiments, the server may not include a separate processor and memory. Instead, in addition to performing their specific tasks, modules 1242-1248, either separately or in concert, may be part of special-purpose computation engines.

Storage 1230 stores programs to be executed by processor 1210. Specifically, storage 1230 stores a program that implements a server (e.g., application) for service object monitoring. During operation, the application program can be loaded from storage 1230 into memory 1220 and executed by processor 1210. As a result, server 1200 can perform the functions described above. Server 1200 can further include a display 1280, and can be coupled via one or more network interfaces to a network 1282.

Data obtaining module 1242 may be configured to obtain resource consumption data corresponding to one or more service objects. Data accumulating module 1244 may be configured to accumulate resource consumption data in a predetermined storage object within a statistical time period corresponding to a service object. Data sequencing module 1246 may be configured to sort the resource consumption data which has been accumulated in the storage object within an update time period corresponding to the service object. Data loading module 1248 may be configured to load the sorted resource consumption data.

Embodiments of the present invention may be implemented on various universal or dedicated computer system environments or configurations. For example, such computer systems may include personal computers, server computers, handheld or portable devices, tablet-type devices, multiprocessor systems, microprocessor-based systems, set-top boxes, programmable electronic consumption devices, network PCs, minicomputers, mainframe computers, distributed computing environments including any of the above systems or devices, and the like.

Embodiments of the present invention may be described within the general context of computer-executable instructions executed by a computer, such as a program module. Generally, the program module includes a routine, a program, an object, an assembly, a data structure and the like for implementing particular tasks or achieving particular abstract data types. Embodiments of the present invention may also be implemented in distributed computing environments, in which tasks are performed by remote processing devices connected via a communication network. In the distributed computing environments, program modules may be located in local and remote computer storage media that may include a storage device.

The data structures and computer instructions described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-implemented method for monitoring resource usage of a computer system, comprising:
receiving, by a statistics module residing in a kernel layer of an operating system of the computer system, resource-consumption data indicating one or more occurrences of resource consumption associated with a service object;
storing resource-consumption data received within a predetermined statistical time period in a data-storage object specific to the service object and the predetermined statistical time period, wherein the predetermined statistical time period is defined by a starting time and an ending time, and wherein the data-storage object is maintained by the statistics module;
in response to a difference between a push timestamp associated with a piece of received resource-consumption data and the starting time of the predetermined statistical time period exceeding a predetermined threshold, updating a service-statistics table residing in the kernel layer based on the data-storage object, wherein the service-statistics table comprises resource usage statistics for a plurality of service objects; and
sorting the updated service-statistics table, thereby facilitating dynamic monitoring of resource usage with reduced computational overhead.

2. The method of claim 1, wherein the predetermined statistical time period comprises N continuous sub-statistical time periods, wherein N is an integer; and
wherein the data-storage object includes N sub-storage objects, each sub-storage object storing resource consumption data associated with one sub-statistical time period.

3. The method of claim 1, wherein storing resource-consumption data received within a predetermined statistical time period in a data-storage object specific to the service object and the predetermined statistical time period comprises:
determining a sub-statistical time period to which the resource-consumption data pertains; and
storing the resource-consumption data in a sub-storage object corresponding to a current sub-statistical time period when the resource-consumption data pertains to the current sub-statistical time period.

4. The method of claim 3, wherein storing resource-consumption data received within a predetermined statistical time period in the storage object specific to the service object and the predetermined statistical time period further comprises:
assigning a second sub-storage object to a next sub-statistical time period when the resource-consumption data pertains to the next sub-statistical time period; and
storing the resource consumption data in the second sub-storage object.

5. The method of claim 3, wherein the sub-storage object is associated with one or more statistical timestamps; and
wherein determining a sub-statistical time period to which the resource-consumption data pertains comprises:
calculating a first time difference between the push timestamp and a most recent statistical timestamp;
determining whether the first time difference is greater than a statistical time threshold;

if the first time difference is greater than the statistical time threshold, determining that the resource consumption data pertains to a next sub-statistical time period; and if the first time difference is not greater than the statistical time threshold, determining that the resource consumption data pertains to the current sub-statistical time period.

6. The method of claim 1, wherein storing resource-consumption data received within a predetermined statistical time period in a data-storage object specific to the service object and the predetermined statistical time period comprises:

setting the push timestamp associated with the piece of received resource-consumption data as a statistical timestamp.

7. The method of claim 1, further comprising:
determining an update time period to which the piece of resource-consumption data pertains.

8. The method according to claim 7, wherein the data-storage object is associated with one or more update timestamps; and wherein determining the update time period to which the piece of resource-consumption data pertains comprises:
calculating a second time difference between the push timestamp and a most recent update timestamp;
determining whether the second time difference is greater than an update time threshold;
if the second time difference is greater than the update time threshold, determining that the piece of resource-consumption data pertains to a next update time period; and
if the second time difference is not greater than the update time threshold, determining that the piece of resource-consumption data pertains to a current update time period.

9. The method according to claim 7, wherein updating the service-statistics table residing in the kernel layer based on the data-storage object comprises:
calculating a sum of the resource-consumption data stored in a sub-storage object corresponding to a sub-statistical time period of the update time period; and
writing the sum of the stored resource-consumption data in the service statistics table.

10. The method according to claim 1, further comprising:
subsequent to updating the service-statistic table, setting a push timestamp associated with a next piece of resource-consumption data as an update timestamp.

11. The method according to claim 1, further comprising loading the sorted service-statistics table;
wherein loading the sorted service-statistics table comprises:
reading the service-statistics table residing in the kernel layer by using a predetermined interface in an application layer to obtain data from the service-statistics table; and
displaying resource-consumption data which is located at the beginning of a sort order from the service-statistics table.

12. The method according to claim 1, further comprising:
residing the data-storage object in a memory during a hot upgrade; and
unregistering the service-statistics table.

13. A computing system comprising:
one or more processors;
a memory; and a non-transitory computer-readable medium coupled to the one or more processors storing instructions stored that, when executed by the one or more processors, cause the computing system to perform a method for monitoring resource usage of the computing system, the method comprising:
receiving, by a statistics module residing in a kernel layer of an operating system of the computing system, resource-consumption data indicating one or more occurrences of resource consumption associated with a service object;
storing resource-consumption data received within a predetermined statistical time period in a data-storage object specific to the service object and the predetermined statistical time period, wherein the predetermined statistical time period is defined by a starting time and an ending time, and wherein the data-storage object is maintained by the statistics module;
in response to a difference between a push timestamp associated with a piece of received resource-consumption data and the starting time of the predetermined statistical time period exceeding a predetermined threshold, updating a service-statistics table residing in the kernel layer based on the data-storage object, wherein the service-statistics table comprises resource usage statistics for a plurality of service objects; and
sorting the updated service-statistics table, thereby facilitating dynamic monitoring of resource usage with reduced computational overhead.

14. The system of claim 13, wherein the predetermined statistical time period comprises N continuous sub-statistical time periods, wherein N is an integer; and
wherein the data-storage object includes N sub-storage objects, each sub-storage object storing resource consumption data associated with one sub-statistical time period.

15. The system of claim 13, wherein storing resource-consumption data received within a predetermined statistical time period in a data-storage object specific to the service object and the predetermined statistical time period comprises:
determining a sub-statistical time period to which the resource-consumption data pertains; and
accumulating the resource-consumption data in a sub-storage object corresponding to a current sub-statistical time period when the resource-consumption data pertains to the current sub-statistical time period.

16. The system of claim 13, wherein storing resource-consumption data received within a predetermined statistical time period in a data-storage object specific to the service object and the predetermined statistical time period comprises:
assigning a second sub-storage object to a next sub-statistical time period when the resource-consumption data pertains to the next sub-statistical time period; and
storing the resource consumption data in the second sub-storage object.

17. A non-transitory computer-readable storage medium storing instructions that when executed by a computer cause the computer to perform a method for monitoring resource usage of a computer system, the method comprising:
receiving, by a statistics module residing in a kernel layer of an operating system of the computer system, resource-consumption data indicating one or more occurrences of resource consumption associated with a service object;

storing resource-consumption data received within a predetermined statistical time period in a data-storage object specific to the service object and the predetermined statistical time period, wherein the predetermined statistical time period is defined by a starting time and an ending time, and wherein the data-storage object is maintained by the statistics module;

in response to a difference between a push timestamp associated with a piece of received resource-consumption data and the starting time of the predetermined statistical time period exceeding a predetermined threshold, updating a service-statistics table residing in the kernel layer based on the data-storage object, wherein the service-statistics table comprises resource usage statistics for a plurality of service objects; and sorting the updated service-statistics table, thereby facilitating dynamic monitoring of resource usage with reduced computational overhead.

18. The non-transitory computer-readable storage medium of claim 17, wherein storing resource-consumption data in a data-storage object specific to the service object and the predetermined statistical time period comprises:

setting the push timestamp associated with the piece of resource-consumption data as a statistical timestamp.

19. The non-transitory computer-readable storage medium of claim 17, wherein the method further comprises:

determining an update time period to which the piece of resource-consumption data pertains.

20. The non-transitory computer-readable storage medium of claim 19, wherein the data-storage object is associated with one or more update timestamps; and wherein determining the update time period to which the piece of resource-consumption data pertains comprises:

calculating a second time difference between the push timestamp and a most recent update timestamp;

determining whether the second time difference is greater than an update time threshold;

if the second time difference is greater than the update time threshold, determining that the piece of resource-consumption data pertains to a next update time period; and if the second time difference is not greater than the update time threshold, determining that the piece of resource-consumption data pertains to a current update time period.

* * * * *